United States Patent
Iwasaki

(10) Patent No.: US 8,042,745 B2
(45) Date of Patent: Oct. 25, 2011

(54) THERMALLY RESPONSIVE VALVE FOR REGULATING ENGINE COOLANT FLOW

(75) Inventor: Mitsuru Iwasaki, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 708 days.

(21) Appl. No.: 11/992,841

(22) PCT Filed: Sep. 28, 2006

(86) PCT No.: PCT/JP2006/319254
§ 371 (c)(1),
(2), (4) Date: Mar. 31, 2008

(87) PCT Pub. No.: WO2007/040130
PCT Pub. Date: Apr. 12, 2007

(65) Prior Publication Data
US 2009/0140055 A1    Jun. 4, 2009

(30) Foreign Application Priority Data
Oct. 3, 2005   (JP) .................... 2005-289485

(51) Int. Cl.
*G05D 23/02* (2006.01)
(52) U.S. Cl. .............. 236/93 A; 236/34.5; 236/93 R; 236/99 J; 236/100

(58) Field of Classification Search ............... 236/34.5, 236/93 A, 93 R, 99 J, 100
See application file for complete search history.

(56) References Cited

FOREIGN PATENT DOCUMENTS

| | | |
|---|---|---|
| JP | 60-121377 A | 6/1985 |
| JP | 61-101617 A | 5/1986 |

OTHER PUBLICATIONS

JP 08210553 A, Imanishi, Masaaki (English Translation).*

* cited by examiner

*Primary Examiner* — Cheryl J Tyler
*Assistant Examiner* — Jonathan Bradford
(74) *Attorney, Agent, or Firm* — Foley & Lardner LLP

(57) ABSTRACT

A thermally responsive valve is installed in a coolant circuit of an engine 1, and is provided with an operating member 7 containing a thermal expansion element 15 which expands and contracts according to a temperature change of coolant to change a longitudinal length of the operating member 7 due to thermal expansion and contraction thereof so as to open and close a valve in the coolant circuit. The thermal expansion element 15 includes a first thermal expansion element 15*a* with lower thermal expansion start temperature and a lower thermal expansion response speed, and a second thermal expansion element 15*b* with a higher thermal expansion start temperature and a higher expansion response speed.

6 Claims, 4 Drawing Sheets

THERMALLY RESPONSIVE VALVE FOR REGULATING ENGINE COOLANT FLOW

TECHNICAL FIELD

The present invention relates to a thermostat device which acts as a temperature-sensitive and automatically-operated valve used for controlling a temperature of engine coolant by switching a flow of the coolant according to a temperature changes thereof, for example, in a coolant circuit of an engine adaptable for a motor vehicle and the like where the coolant for cooling the engine is circulated between the engine and a heat exchanger.

DESCRIPTION OF THE RELATED ART

A conventional thermostat device that is provided in a coolant circuit of an internal combustion engine contains a thermal expansion element, which thermally expands and contracts according to a thermal change of coolant so as to open and close a valve due to a volume change of the thermal expansion element (Refer Patent Reference 1 for example).
[PATENT REFERENCE 1] Japanese Patent Application Laid-open No. Sho 60-121377

DESCRIPTION OF THE INVENTION

Problem(s) to be Solved by the Invention

Since the thermal expansion element contained in the conventional thermostat device is designed to have only one predetermined value for determining a thermal expansion start temperature and only one predetermined value for determining a thermal expansion response speed, there is, however, the following problem therein.

Specifically, in the conventional thermostat device provided in the coolant circuit of the internal combustion engine, the thermal expansion start temperature and the thermal expansion response speed of the thermal expansion element are set to be approximately 90° C. for example and high response value, respectively, so as to open as quick as possible in reaction with a temperature thereof, in order to enhance a valve open response at a high temperature, for example, approximately 90° C.

This conventional thermostat device abruptly opens when the temperature reaches the thermal expansion start temperature, so that a thermal shock may occur in a radiator because a large amount of the coolant at a high-temperature suddenly rushes in the radiator at this initial valve opening time. This causes a problem in that a manufacturing cost of the device becomes higher because a special countermeasure against the thermal shock is needed.

It is an object of the invention to provide a thermostat device which can prevent a thermal shock from being occurred in a radiator due to sudden flow-in of coolant at high temperature, ensuring to obtain a high response needed in a valve opening at the high temperature, and eliminating a special countermeasure against a thermal shock in the radiator.

Means for Solving the Problem(s)

The invention is made in order to solve the problem, and the invention includes a thermally responsive valve for regulating engine flow which thermally expands and contracts according to a thermal change of coolant flowing in a coolant circuit of an engine, an operating member contains the thermal expansion element, a longitudinal length of the operating member being changed due to a volume change of the thermal expansion element, and a valve element for opening and closing the coolant circuit, which connects the engine and a heat exchanger with each other, according to a change of the longitudinal length of the operating member due to the volume change of the thermal expansion element. The thermal expansion element is constructed to have at least two kinds of thermal expansion elements including a first thermal expansion element and a second thermal expansion element. A thermal expansion start temperature of the first thermal element is lower than a thermal expansion start temperature of the second thermal element, and a thermal expansion response speed of the first thermal expansion element is lower than a thermal expansion response speed of the second thermal expansion element. The valve element is opened by the first thermal expansion element at a response speed rate wherein an opening degree of the valve element becomes from 0% to 10% for approximately 30 seconds after the first thermal expansion element starts to expand at approximately 80° C.

EFFECTS OF THE INVENTION

In the thermostat device of the invention, as described above, the thermal expansion element is constructed to contain two kinds of thermal expansion elements including the first thermal expansion element and the second thermal expansion element, where the thermal expansion start temperature and the thermal expansion response speed of the first thermal expansion element are lower and the thermal expansion start temperature of the second thermal expansion element is higher than that of the first thermal expansion element and the thermal expansion response speed of the second thermal expansion element is higher than that of the first thermal expansion element. When the temperature of the coolant reaches the thermal expansion start temperature, which is set to be lower, of the first thermal expansion element, the first thermal expansion element starts to expand and open the valve at its initial stage, then slowly opening the valve, namely responding at a low speed, until it reaches the thermal expansion start temperature of the second thermal expansion element. Accordingly, this can prevent a thermal shock from being occurred in the radiator due to sudden flow-in of the coolant at high temperature. Then, when the temperature of the coolant reaches the thermal expansion start temperature, which is set to be higher, of the second thermal expansion element, the second thermal expansion element rapidly expands to open the valve at high speed (respond at high speed). Therefore, the thermostat device can ensure valve-open high-speed response at a high temperature.

Accordingly, the thermostat device of the invention can obtain the effects on prevention against the occurrence of the thermal shock in the radiator, ensuring to obtain the valve-open high-speed response to be needed at high temperature, without the special countermeasure against the thermal shock in the radiator.

Figure 1:
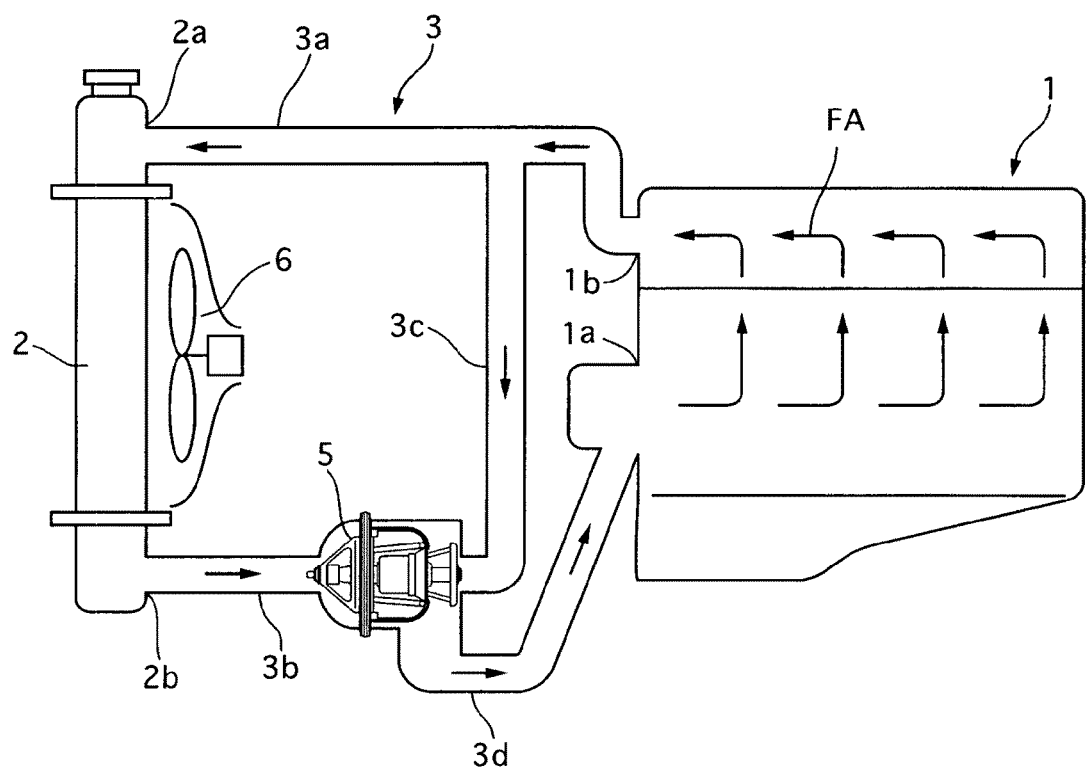
FIG. 1 is a schematic diagram showing a coolant cooling system of an engine adapted for a motor vehicle, to which a thermostat device of an embodiment according to the present invention is applied.

DESCRIPTION OF REFERENCE NUMBER 1 engine
1a coolant inlet part of the engine
1b coolant outlet part of the engine
2 radiator
2a coolant inlet part of the radiator
2b coolant outlet part of the radiator
3 coolant circuit
3a outflow side coolant circuit
3b first inflow side coolant circuit
3c bypass passage
5 thermostat device
6 cooling fan unit
7 operational member
7a temperature sensing part
7b guide part
7c piston rod
8 first valve element
9 second valve element
10 compression coil spring
12 press receiving frame
12a flange-like portion
12b packing
13 valve rod
14 compression coil spring
15 thermal expansion element
15a first thermal expansion element
15b second thermal expansion element

BEST MODE FOR CARRYING-OUT OF THE INVENTION

Hereinafter, an embodiment according to the present invention will be described.

Embodiment 1

First, a thermostat device of the embodiment 1 will be described with reference to the accompanying drawings.

As shown in FIG. 1, a cooling system of an automotive engine using the thermostat device of the embodiment includes an engine 1, a radiator 2 acting as a heat exchanger, a coolant circuit 3 connecting the engine 1 and the radiator 2 with each other, and a thermostat device 5 provided in the coolant circuit 3. Incidentally, in this embodiment, an internal combustion engine such as a gasoline engine and a diesel engine is employed as the engine 1, where a coolant passage for flowing the coolant therein, as indicated by arrows, is formed in a cylinder block and a cylinder head of the engine 1.

The radiator 2 is, as widely known, formed with the coolant passage by using a plurality of tubes and a pair of tanks, which are not-shown. A top end side portion and a bottom end portion of the radiator 2 are provided with a coolant inlet part 2a and a coolant outlet part 2b, respectively. The coolant inlet part 2a and the coolant outlet part 2b are fluidically connected through the coolant circuit 3 with a coolant outlet part 1b provided at a top end portion of the engine 1 and a coolant inlet part 1a provided at a bottom end portion thereof, respectively, so that the coolant can be circulated between the engine 1 and the radiator 2.

The coolant circuit 3 consists of an outflow side coolant passage 3a, an inflow side coolant passages 3b and 3d and a bypass passage 3c, where the outflow side passage 3a fluidically communicates between the coolant outlet part 1b of the engine 1 and the coolant inlet part 2a of the radiator 2, the inflow side coolant passage 3b and 3d fluidically communicate between the coolant outlet part 2b of the radiator 2 and the coolant inlet part 1a of the engine 1, and the bypass passage 3c fluidically connects between intermediate portions of the coolant passages 3a and 3b.

A coolant circulating passage of the engine cooling system is constructed by the coolant passage of the engine 1, the coolant passage of the radiator 2 and the coolant circuit 3.

The thermostat device 5 is provided at an intersecting portion, where the engine inlet-side intermediate portion of the inflow coolant passage 3b and the bypass passage 3c are intersected with each other, in order to control a flow and a flow rate of the coolant in the coolant circuit 3. Under this valve open and close control, the thermostat device 5 is capable of shifting the coolant passing through the radiator 2 and the coolant passing through the bypass passage 3c from each other so as to flow the shifted coolant into the coolant inlet part 1a of the engine 1.

Incidentally, the inflow side coolant passage has a first inflow side coolant passage 3b and a second inflow side coolant passage 3d, where the first inflow side coolant passage 3b fluidically communicates the radiator 2 and a connecting portion with each other, and the second inflow side coolant passage 3d fluidically communicates the engine 1 and the connecting portion with each other.

In addition, at a rear side of the radiator 2, a cooling fan unit 6 is installed for forcibly providing the radiator 2 with cooling air.

The flow of the coolant in the coolant circuit 3 is shift-controlled by the thermostat device 5. In other words, the thermostat device 5 is constructed to prevent the coolant passing through the radiator 2 from being flown into the engine 1, so as to circulate the coolant passing through the bypass passage 3c in the engine 1 when the temperature of the coolant is low, while it prevents the coolant passing through the bypass passage 3c from being flown into the engine 1, so as to flow the coolant passing through the radiator 2 into the engine 1, circulating the coolant between the radiator 2 and the engine 1.

Next, a construction of the thermostat device 5 of the embodiment will be described with reference to the drawings of FIGS. 2 and 3.

Figure 2:
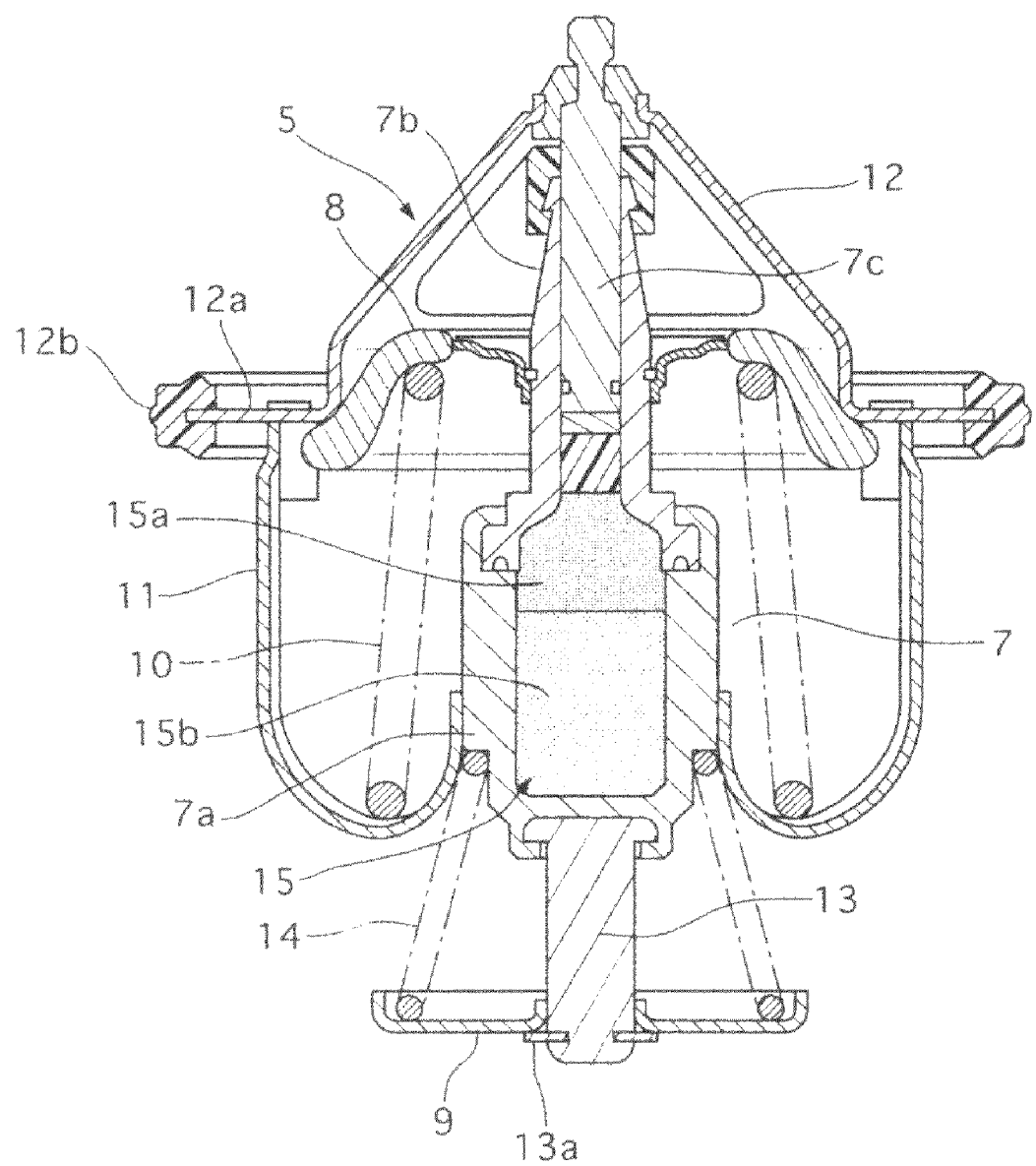
FIG. 2 is a cross sectional view of the thermostat device, of the embodiment shown in FIG. 1, in a state where a valve is closed.
Figure 3:
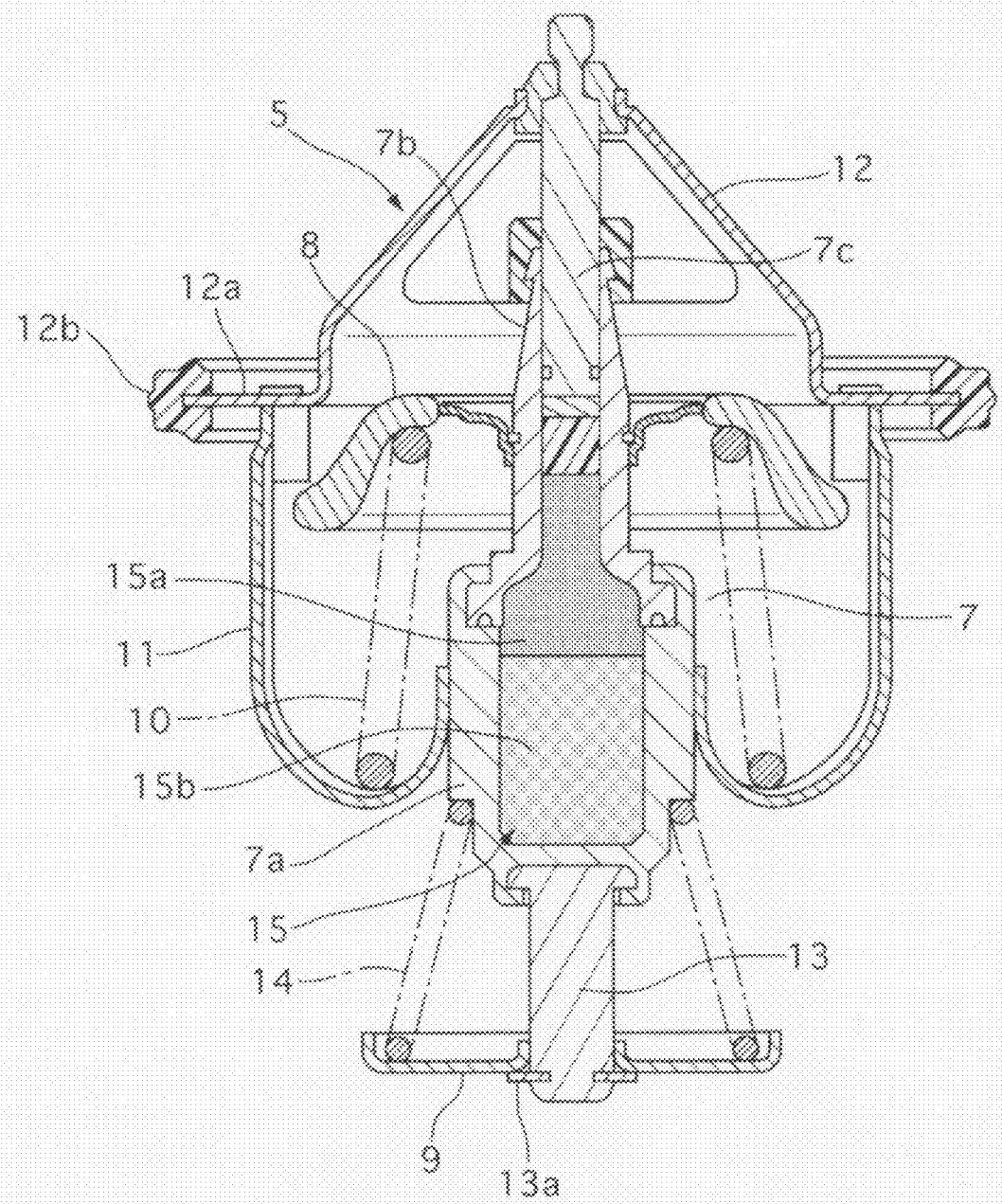
FIG. 3 is a cross sectional view of the thermostat device, of the embodiment shown in FIGS. 1 and 2, in a state where the valve is opened.

The thermostat device 5 includes a first valve element 8, a second valve element 9, a compression coil spring 10 and a main body frame 11, where the first valve element 8 is fixed on one end side, namely an upper side in FIGS. 2 and 3, of an operational member 7 which is capable of moving in a longitudinal direction thereof according to a temperature change of the coolant, the second valve element 9 is fixed on the other end side, namely the lower portion in FIGS. 2 and 3, of the operational member 7, the compression coil spring 10 biases the first valve element 8 toward a valve-close position thereof, and the main body frame 11 slidably guides the operational member 7 and contains the compression coil spring 10.

The operational member 7 is, what is called, a thermo element, and has a temperature sensing part 7a, a guide part 7b and a piston rod 7c, where the temperature sensing part 7a contains a thermal expansion element 15, such as a wax, which detects the temperature of the coolant to expand and contract, the guide part 7b is integrally fixed on one end side of the temperature sensing part 7a, and the piston rod 7c is contained in the guide part 7b. The operational member 7 is constructed in such that the temperature sensing part 7a and the guide part 7b are capable of moving in their longitudinal direction relative to the piston rod 7c so that the operational member 7 can change a longitudinal length thereof.

On a tip portion of the piston rod 7c, a press receiving frame 12, which is shaped like a circular cone, is fixed so that the piston rod 7c cannot move. A cone portion of the press receiving frame 12 is formed with openings which enables the coolant to pass therethrough.

The first valve element 8 is fixed on the guide part 7b so that it can move in the longitudinal direction together with the guide part 7b, and it is constructed to be capable of being pressed on the press receiving frame 12 formed with a valve seat for the first valve element 8. Accordingly, the first valve element 8 and the press receiving frame 12 act as a first valve. In addition, the press receiving frame 12 is provided at its outer side with a flange portion 12a projecting outwardly as a portion for connecting with the coolant passage. A packing 12b is fitted around an outer circumference of the flange portion 12a, to which the main body frame 11 is fixed.

The second valve element 9 is fixed, by using a stopper 13a, to a valve rod 13 projecting from a rear end portion of the temperature sensing part 7a, and the second valve element 9 is elastically pressed toward the stopper 13a by a compression coil spring 14 disposed between the second valve element 9 and the temperature sensing part 7a. The second valve element 9 is capable of contacting with a wall forming the coolant passage at its valve-close position, and accordingly the wall and the second valve element 2 act as a second valve.

The compression coil spring 10 is provided between the first valve element 8 and the main body frame 11 in a compression state thereof, so as to urge the first valve element 8 toward the valve-close position, namely toward the press receiving frame 12.

The thermal expansion element 15 consists of two kinds of elements, a first thermal expansion element 15a in which a thermal expansion start temperature and a thermal expansion response speed thereof are lower, and a second thermal expansion element 15b in which a thermal expansion start temperature thereof is higher than that of the first thermal expansion element 15a and a thermal expansion response speed thereof is higher than that of the first thermal expansion element 15a.

Next, the operation and effects of the thermostat device 5 of the embodiment will be described.

In the thermostat device 5, the first valve element 8 and the second valve element 9 can be moved to a position where the first valve element 8 opens and closes the first inflow side coolant passage 3b so that the passage 3b and the second inflow side coolant passage 3d can be fluidically connected with each other and blocked off from each other, and to a position where the second valve element 9 opens and closes the bypass passage 3c so that the passage 3c and the second inflow side coolant passage 3d can be fluidically connected with each other and blocked off from each other. The thermostat device 5 is set to act as follows.

Specifically, the thermal expansion element 15 in the temperature sensing part 7a expands due to a temperature rise in the coolant, which causes the piston rod 7c to be pressed. Consequently, the temperature sensing part 7a and the guide part 7b move together against urging force of the compression coil spring 10 toward the other end portion relative to the piston rod 7c, in other words, the longitudinal length of the operational member 7 becomes longer. Specifically, it is set so that the first valve is closed and the second valve is opened when the temperature of the coolant is low, for example, lower than 80° C., while the first valve is opened and the second valve is closed when the temperature of the coolant is high, for example, higher than 90° C.

Accordingly, the first valve element 8 moves to the valve-open position, thereby opening the first inflow side coolant passage 3b to fluidically communicate this passage 3b and the second inflow side coolant passage 3d with each other, and the second valve element 9 moves the valve-close position, thereby closing the bypass passage 3c to fluidically blocking off this passage 3c and the second inflow side coolant passage 3d from each other. This enhances a cooling capacity of the engine 1.

On the other hand, the thermal expansion element 15 contracts due to a temperature drop in the coolant, the urging force of the piston rod 7c, generated by the thermal expansion element 15, becomes smaller, so that the longitudinal length of the operational member 7 becomes shorter.

Specifically, the urging force 10 moves the first valve element 8 to the valve-close position so as to contact with the press receiving frame 12, thereby closing the first inflow side coolant passage 3b. At the same time, the second valve element 9 is moved to the valve-open position to open the bypass passage 3c.

Thus, the thermostat device 5 serves as a temperature sensing automatic valve, and it controls the temperature of the coolant in a water jacket of the engine 2 to be a suitable temperature, by shifting between the coolant which is warmed up by the water jacket and the coolant which is cooled by the radiator 2 and by mixing up the coolants, in the engine coolant circuit 3.

In order to shift the flow of the coolant, the thermal expansion element 15 has the two kinds of elements consisting of the first thermal expansion element 15a in which the thermal expansion start temperature thereof is lower and the thermal expansion response speed thereof is lower, and the second thermal expansion element 15b in which the thermal expansion start temperature thereof is higher than that of the first thermal expansion element 15a and the thermal expansion response speed thereof is higher than that of the first thermal expansion element 15a, and accordingly an initial valve-open temperature and a valve-open speed are set as follows.

Figure 4:
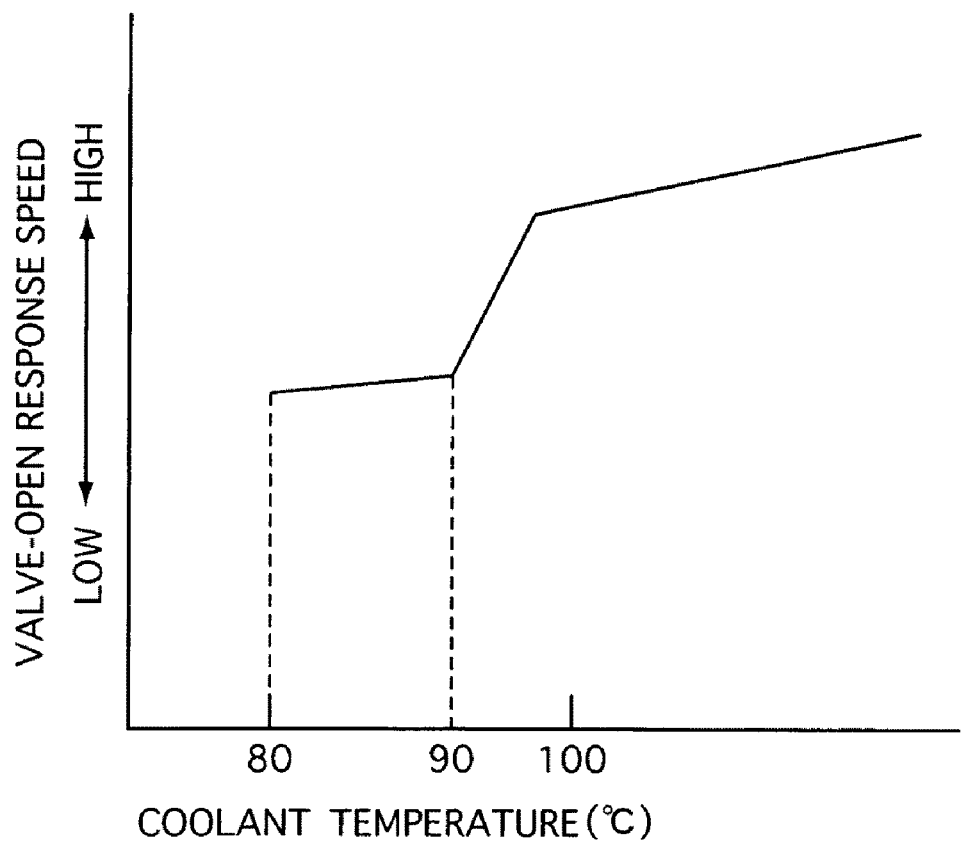
FIG. 4 is a graph showing a relationship between a temperature of coolant and a valve open response speed, in the thermostat device, of the embodiment shown in FIGS. 1 to 3.

Specifically, in the embodiment, as shown in FIG. 4, the first thermal expansion element 15a employs a thermal expansion element having characteristics of low temperature and low speed response in which it starts to expand at approximately 80° C., which is lower than 90° C. of the thermal expansion start temperature of the second valve, and the second valve 9 causes the first valve to open at a rate of 10% thereof for 30 seconds until approximately 90° C. On the other hand, the second thermal expansion element 15b employs a thermal expansion element having characteristics of high temperature and high speed response in which it starts to expand at approximately 90° C., which is lower than 80° C. of the thermal expansion start temperature of the first valve, and causes the first valve to open the rest, 90%, thereof for ten seconds.

In the thermostat device 5 of the embodiment, as described above, the thermal expansion element 15 is constructed as a structure having the two kinds of elements consisting of the first thermal expansion element 15a in which the thermal expansion start temperature thereof is lower and the thermal expansion response speed thereof is: lower, and the second thermal expansion element 15b in which the thermal expansion start temperature thereof is higher than that of the first thermal expansion element 15a and the thermal expansion response speed thereof is higher than that of the first thermal expansion element 15*a*. Therefore, this structure can prevent a thermal shock from being occurred in the radiator due to abrupt inflow of the coolant at high temperature, by starting to expand the thermal expansion 15*a* to initially open the valve, namely responding at a low temperature, when the temperature of the coolant reaches the thermal expansion start temperature (approximately 80° C.) of the first thermal expansion element 15*a*, and also by slowly opening the valve, namely responding at a low speed, until the temperature of the coolant reaches the thermal expansion start temperature (approximately 90° C.) of the second thermal expansion element 15*b*. Further, the second thermal expansion rapidly heat-expands to rapidly open the valve, namely responding at a high temperature and at a high speed, when the temperature of the coolant reaches the thermal expansion start temperature (approximately 90° C.). This can provide a high-speed valve-open response at a high temperature.

Accordingly, the thermostat device 5 of the embodiment can obtain the effects in that an occurrence of a thermal shock can be prevented in the radiator 2, ensuring a high-speed valve-open response at a high temperature, without a special countermeasure provided in the radiator 2.

While the embodiment has been explained, the invention is not limited to the embodiment described above, design changes and modifications are included within the invention as long as they are within a scope of a subject matter of the invention.

For example, the valve-open temperatures and the valve-open speed are set differently from those of the embodiment. The first thermal expansion element 15*a* may be set so that the first valve is opened at a rate of 5%-10% thereof for approximately 30 seconds at approximately 80° C., and the second thermal expansion element 15*b* may be set so that the first valve is opened at a rate of 95%-90% thereof for approximately 10 seconds at approximately 90° C. for example.

Further, the thermostat device contains the two kinds of thermal expansion elements having different characteristics in the embodiment, while it may contain more than two kinds of elements so as to further precisely control the characteristics of the valve open temperature and the valve open speed.

In addition, a containing amount of the second thermal expansion element 15*b* is larger than that of the first thermal expansion element 15*a* in the embodiment, while they can be set appropriately according to the valve-open characteristics.

Further, the thermal expansion element 15 consists of the first thermal expansion element 15*a* and the second thermal expansion element 15*b* which are installed in a stratified state in the embodiment, while they are not limited to this installation. What matters is that two kinds or more than two kinds of thermal expansion elements are set to exert these characteristics.

Further, The piston rod 7*c* is fixed and the thermal sensing part 7*a* and the guide part 7*b* are constructed to move relative to the piston rod 7*c* in the embodiment, while they are not limited to this structure, for example, the thermal sensing part 7*a* and the guide part 7*b* are fixed, and a piston rod which is attached to the first valve element 8 and the second valve element 9 may move relative thereto.

INDUSTRIAL APPLICABILITY

The thermostat device of the invention may be applied to a cooling system which is capable of cooling an internal combustion engine or the like by switching a flow of coolant according to a temperature of the coolant.

The invention claimed is:

1. A thermally responsive valve for regulating engine coolant flow comprising:
    a thermal expansion element which thermally expands and contracts according to a thermal change of coolant flowing in a coolant circuit of an engine;
    an operating member which contains the thermal expansion element, a longitudinal length of the operating member being changed due to a thermal expansion and a thermal contraction of the thermal expansion element; and
    a valve element for opening and closing the coolant circuit, which connects the engine and a heat exchanger with each other, according to a change of the longitudinal length of the operating member due to a volume change of the thermal expansion element, wherein
    the thermal expansion element includes at least two kinds of thermal expansion elements including a first thermal expansion element and a second thermal expansion element,
    wherein a thermal expansion start temperature of the first thermal expansion element is lower than a thermal expansion start temperature of the second thermal expansion element,
    wherein a thermal expansion response speed of the first thermal expansion element is lower than a thermal expansion response speed of the second thermal expansion element,
    wherein the valve element is opened by the first thermal expansion element at a response speed rate, and
    wherein an opening degree of the valve element becomes from 0% to 10% for approximately 30 seconds after the first thermal expansion element starts to expand at approximately 80 ° C.

2. The thermally responsive valve according to claim 1, wherein
    the second thermal expansion element starts to expand at approximately 90 ° C.

3. The thermally responsive valve according to claim 1,
    wherein the valve element is opened by the second thermal expansion element at a response speed rate,
    wherein an opening degree of the valve element becomes from 10% to 100% for approximately 10 seconds after the second thermal expansion element starts to expand at approximately 90 ° C.

4. The thermally responsive valve according to claim 1,
    wherein the thermally responsive valve is provided at an intersecting portion where an intermediate portion of an inflow side coolant circuit and a bypass passage are intersected with each other,
    wherein the inflow side coolant circuit connects a coolant outlet part of a radiator and a coolant inlet part of the engine, and
    wherein the bypass passage connects the coolant inlet part of the engine and the intermediate portion of the inflow side coolant circuit.

5. The thermally responsive valve according to claim 2,
    wherein the thermally responsive valve is provided at an intersecting portion where an intermediate portion of an inflow side coolant circuit and a bypass passage are intersected with each other,
    wherein the inflow side coolant circuit connects a coolant outlet part of a radiator and a coolant inlet part of the engine, and wherein the bypass passage connects the coolant inlet part of the engine and the intermediate portion of the inflow side coolant circuit.

6. The thermally responsive valve according to claim 3, wherein the thermally responsive valve is provided at an intersecting portion where an intermediate portion of an inflow side coolant circuit and a bypass passage are intersected with each other, wherein the inflow side coolant circuit connects a coolant outlet part of a radiator and a coolant inlet part of the engine, and wherein the bypass passage connects the coolant inlet part of the engine and the intermediate portion of the inflow side coolant circuit.

* * * * *